(12) United States Patent
Fukuhara et al.

(10) Patent No.: US 6,339,659 B1
(45) Date of Patent: Jan. 15, 2002

(54) FRACTAL CODING/DECODING OF PICTURE DATA USING MEMORY CAPACITY INFORMATION

(75) Inventors: Takahiro Fukuhara; Akio Ooba, both of Kanagawa (JP)

(73) Assignees: Sony Corporation; Sony Computer Entertainment Inc., both of Tokyo (JP)

( * ) Notice: Subject to any disclaimer, the term of this patent is extended or adjusted under 35 U.S.C. 154(b) by 0 days.

(21) Appl. No.: 09/179,329

(22) Filed: Oct. 27, 1998

(30) Foreign Application Priority Data

Oct. 28, 1997 (JP) ............................................. 9-295481

(51) Int. Cl.[7] .................................................. G06K 9/46
(52) U.S. Cl. ...................................... 382/249; 382/242
(58) Field of Search ................................ 382/232, 233, 382/234, 235, 236, 237, 238, 239, 240, 241, 242, 243, 244, 245, 246, 247, 248, 249, 250, 251, 253; 348/416, 417, 418, 405, 406, 422

(56) References Cited

U.S. PATENT DOCUMENTS

| | | | | |
|---|---|---|---|---|
| 4,217,609 A | * | 8/1980 | Hatori et al. ................ 358/136 |
| 4,941,193 A | * | 7/1990 | Barnsley et al. .............. 382/56 |
| 5,065,447 A | * | 11/1991 | Barnsley et al. .............. 382/56 |
| 5,347,600 A | * | 9/1994 | Barnsley et al. .............. 382/56 |
| 5,729,633 A | * | 3/1998 | Watanabe et al. ........... 382/239 |
| 5,768,437 A | * | 6/1998 | Monro et al. ................ 382/249 |
| 5,867,221 A | * | 2/1999 | Pullen et al. ................ 348/417 |
| 5,867,603 A | * | 2/1999 | Barnsley et al. ............ 382/249 |
| 5,903,674 A | * | 5/1999 | Ooi ............................. 382/238 |
| 5,995,673 A | * | 11/1999 | Ibenthal et al. ............. 382/249 |
| 6,055,335 A | * | 4/2000 | Iida et al. .................... 382/232 |
| 6,198,851 B1 | * | 3/2001 | Kato et al. ................... 382/248 |

* cited by examiner

Primary Examiner—Phuoc Tran
Assistant Examiner—Amir Alavi
(74) Attorney, Agent, or Firm—Frommer Lawrence & Haug LLP; William S. Frommer; Glenn F. Savit

(57) ABSTRACT

Encoding/decoding apparatus includes an encoding device having a picture memory for storing input picture data and having a search range determining unit for determining a range of a picture to be iteratively coded. A coded bit stream is generated from the picture data that is iterative coded within the determined range. A decoding device has a picture memory for storing picture data obtained from the coded bit stream received from the encoding device. The decoding device also has maximum allowable memory capacity determining unit for calculating maximum decodable capacity of the picture memory to carry out iterated function decoding on the coded bit stream and to output the decoded data as decoded picture data. The encoding/decoding apparatus provides high coding efficiency by using small memory capacity and a picture of high quality.

19 Claims, 16 Drawing Sheets

FRACTAL CODING/DECODING OF PICTURE DATA USING MEMORY CAPACITY INFORMATION

BACKGROUND OF THE INVENTION

This invention relates generally to encoding/decoding method and apparatus and recording medium, and more particularly, to an encoding method and apparatus, a decoding method and apparatus, and a recording medium usable in a system for high efficiency picture encoding or decoding for efficient picture transmission.

The International organization for Standardization (ISO) has promulgated a standard for a conventional picture compression system called Joint Photographic Expert Group (JPEG). This system provides optimal encoding or decoding of pictures by applying a Discrete Cosine Transformation (DCT) to an image to transform that image into DCT coefficients. This system works most efficiently when a relatively large number of bits are to be employed to represent the encoded information. However, if the number of bits to be employed to represent the encoded information is less than a certain predetermined value, block distortion inherent in such a DCT transform becomes prevalent enough to deteriorate the quality of the picture which may be noticed by a viewer.

In response to these deficiencies of the JPEG and DCT procedure, a new Iterated Function System (IFS) picture compression technique has been proposed, and is beginning to gain favor. This IFS technique exploits self-similarity between portions of pictures and is based on fractal geometry. IFS works on the assumption that various portions of a particular picture are analogous, even though they may be of a different size, position, perspective, or orientation. IFS utilizes this redundancy in pictures to efficiently encode the picture without resulting block distortion, as may be generated in the JPEG system. Therefore, IFS is not nearly as dependent upon the number of bits to be used to represent the encoded information, and therefore the resolution during decoding does not suffer when a relatively smaller number of bits are to be used to represent the encoded information.

The basic structure of IFS is set forth in Arnaud E. Jaquin's publication entitled "Image Coding Based on a Fractal Theory of Iterated Contractive Image Transformations", IEEE Transactions on Image Processing (Vol. 1, No. 1, pp. 18–30), and is further set forth in U.S. Pat. Nos. 5,347,600; 5,065,447 and 4,941,193, all issued to Barnsley et al. The encoding and decoding devices as generally known in the art will now be described with reference to FIGS. 15 and 16.

Referring first to FIG. 15, the conventional operation of encoding device is shown. As set forth in FIG. 15, original picture data 300 is entered to a block generating circuit 200 and is therein split into a plurality of block data 301. The entire block data 301 cover the entire original picture data 300, but the blocks do not overlap with each other. Original picture data 300 is also forwarded to reduced picture generating circuit 202. Picture data 307 having a reduced (shrunk) size, such as by way of a reduction scheme as is known in the art which is obtained through the processing of reduced picture generating circuit 202, is forwarded and stored within reduced picture storage circuit 204.

Data in each of the blocks is forwarded to approximate area search circuit 201 which searches reduced size picture data 307 stored in reduced picture storage circuit 204 to determine whether any portions of the reduced size picture data are analogous to the particular block data 301 being searched. As noted above, this search includes searching for portions of reduced size picture data 307 which are of different size, position, perspective, or orientation than the block data 301 being searched. In accordance with the detected result indicating a successful search for a most similar portion, similar block position information 306, which specifies the position of the selected portion 305 within the reduced size picture data 307 that is to be extracted, is transmitted to reduced picture storage circuit 204. Thus, in accordance with these instructions, selected portion 305 of the reduced size picture data 307 stored within reduced picture storage circuit 204 is extracted, and is transmitted to a rotation/inversion/level value transform circuit 203.

Within rotation/inversion/level value transform circuit 203, portion 305 of reduced size picture data 307 is processed by rotation/inversion/level value transformation in accordance with transformation parameters 304 which are supplied from approximate area search circuit 201. The transformation parameters 304 are indicative of the transformation which must be performed in order to transform portion 305 of reduced size picture data 307 into block data 301. These parameters are determined when a particular portion 305 of reduced size picture data 307 is found to most closely correspond to block data 301 being searched. Upon transformation at rotation/inversion/level value transform circuit 203, transformed reduced-size picture data 303 is forwarded to approximate area search circuit 201. There as a result, transformation parameters 304 and similar block position information 306 are output as ISF codes 302. Thus, a first picture is input to the system, and the output includes at least transformation parameters, for transforming a first block into a second similar block, and position information, for determining the position of the second block within the encoded picture.

Referring next to FIG. 16, decoding apparatus is provided in which the IFS codes, including transformation parameters and similar block position information 302 which are output by the encoding device of FIG. 15, are entered into and stored in an IFS code storage circuit 205. IFS codes 302 are then sequentially read out from IFS code storage circuit 205 for each block, and are forwarded to IFS code reading circuit 206. IFS code reading circuit 206 divides the codes into similar block position information 306 and transformation parameters 304 as provided by the encoder. Similar block position information 306 is then forwarded to reduced picture storage circuit 204 in order to reproduce the area of the reduced-size picture specified by similar block position information 306. The portion 305 of the reduced size picture data stored in reduced picture storage circuit 204 corresponding to the specified area is then transmitted to rotation/inversion/level value transform circuit 203, and is transformed in accordance with transformation parameters 304 which are supplied form IFS code reading circuit 206. The resulting transformed picture data 303 forwarded from rotation/inversion/level value transform circuit 203 is stored within decoded picture storage circuit 208. This procedure is performed for each block in the picture for which IFS codes are provided.

After all of the IFS codes for all of the blocks have been read out, IFS code reading circuit 206 sends a READ OUT END notification signal 310 to duplication control circuit 207. Duplication control circuit 207 counts the number of recursive decoding/duplicating operations that have been executed, and if this count has not yet reached a predetermined value, duplication control circuit 207 sends a reprocessing command signal 309 to IFS code reading circuit 206 in order to continue execution of decoding processing for all of the blocks in the picture according to a recursive decoding procedure. Simultaneously, the reprocessing command information is sent via control signal 311 to a switch 209 in order to send partially decoded picture data 313 to reduced picture generating circuit 202 via information path 314. Reduced picture generating circuit 202 then generates partially decoded reduced size picture data 315 of decoded picture data 313 in a manner similar to that as in the encoding device in order to re-write the contents of the picture stored in reduced picture storage circuit 204 and to enable a next recursive decoding step to start with partially decoded reduced picture data 315. If the proper number of recursive decoding operations have taken place, and thus the duplicating operation has been carried out the predetermined number of times, reprocessing command information is sent by a decoded picture output control signal 311 to a switch 209. Switch 209 is controlled in order to couple decoded picture data 313 output from decoded picture storage circuit 208 to a picture output port 316. Decoded picture data 313 comprises picture data of all of the decoded blocks noted above after being recursively decoded for a predetermined number of iterations and is read out from decoded picture storage circuit 208 in accordance with control signal 312.

In the above-described conventional technique, the approximate degree of similarity between blocks located at arbitrary positions in the entire picture and the reduced/transformed picture is measured, and position information of the most similar block (an approximate block position information) and a transform parameter at that time are selected from all of the possible candidates. In many cases, a reference block required in coding a certain block is located at a distant position in the picture from that certain block. In such case, a picture memory of large capacity for storing substantially all of the blocks in the picture must be retained by a decoder and encoder, and the memory must be frequently accessed. Therefore, it would be beneficial to provide an improvement which overcomes the drawbacks as set out above.

SUMMARY OF THE INVENTION

In view of the foregoing problems, it is an object of the present invention to provide an encoding device and method, a decoding device and method, an encoding and decoding device and method, an information signal transmission device, and a recording medium which enable picture restoration using a picture memory with small capacity.

In the method for iterated function coding each block in a picture, an input picture is stored in a first picture memory. Capacity information is received indicating a maximum allowable memory capacity of a second picture memory for performing an iterated function decoding of the coded picture. A search range is determined in the stored input picture; and each block is iterated function coded in accordance with the received capacity information within the determined search range.

According to one aspect of the present invention, a portion of the input picture within the determined search range is stored in a local memory.

According to another aspect of the present invention, the iterated function coding comprises generating a first picture block from the input picture, generating a plurality of second picture blocks from a portion of the input picture within the determined search range, transforming the second picture blocks according to a predetermined operation, determining a transformed second picture block that is the most similar to the first picture block, selecting a second picture block corresponding to the determined transformed second picture block, and outputting code position information indicating a position of the selected second picture block and outputting a transformation parameter representing the transformation of the selected second picture block.

In the method for producing a decoded picture from a code representing blocks of an iterated function coded picture, capacity information is generated. The generated capacity information, indicating a maximum allowable memory capacity of a picture memory for decoding the code, is outputted. According to the inventive method, the code and a transformation parameter are received: the code includes block position information for indicating a position of a picture block in a picture, and the transformation parameter represents a predetermined transform operation that has been carried out on the picture block. The picture block identified by the block position information is recursively transformed according to the received transformation parameter using the picture memory until a preselected condition is satisfied.

BRIEF DESCRIPTION OF THE DRAWINGS

Other objects and advantages of the present invention will be apparent from the following detailed description of the presently preferred embodiments thereof, which description should be considered in conjunction with the accompanying drawings in which.

DETAILED DESCRIPTION OF THE PREFERRED EMBODIMENTS

The encoding apparatus and method, the decoding apparatus and method, the information signal transmission apparatus, and the recording medium according to the present invention will now be described with reference to the drawings.

Figure 1:
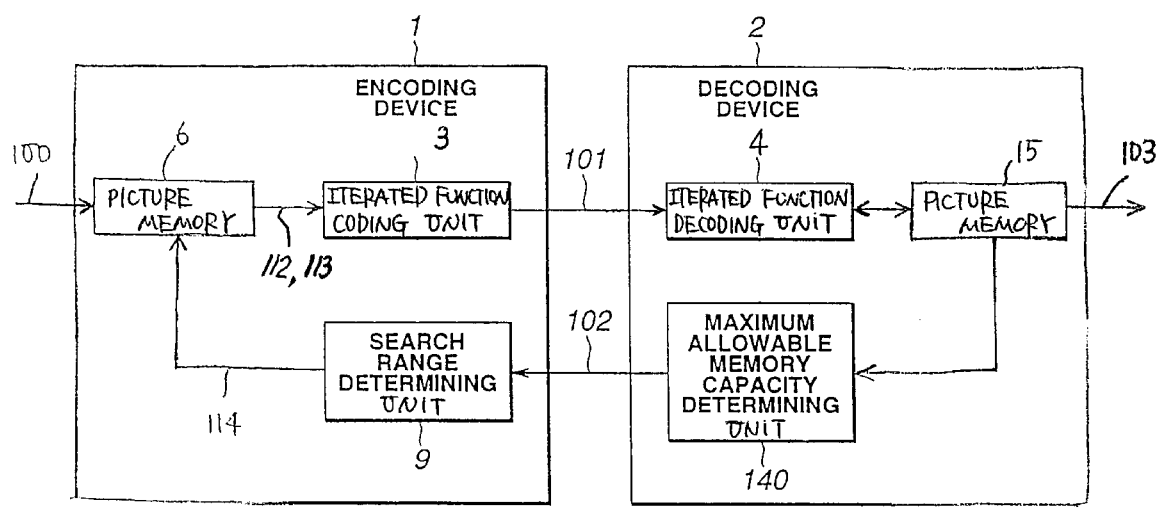
FIG. 1 is a block diagram of an encoding and decoding device.

First, the encoding and decoding apparatus will be described with reference to FIG. 1. This encoding and decoding apparatus includes an encoding device 1 for coding an input picture so as to output a coded bit stream 101, which is a bit stream of code words, and a decoding device 2 for receiving and decoding the coded bit stream 101 to generate a decoded picture.

In the encoding and decoding apparatus, the encoding device 1 has a picture memory 6 into which original picture data 100 to be inputted is stored; an iterated function coding unit 3 which codes the picture data 112, 113 supplied from the picture memory 6; and a search range determining unit 9 which determines a search range for use in iterated function coding operations based on a maximum allowable memory capacity information 102. A coded bit stream 101 from the iterated function coding unit 3 is supplied to the decoding device 2 over a communication network. The decoding device 2 includes an iterated function decoding unit 4 which decodes the coded bit stream of code words and outputs a decoded picture, picture memory 15 into which the decoded picture data is stored and a maximum allowable memory capacity determining unit 140 which determines a decodable maximum allowable memory capacity of the picture memory 15 and outputs the maximum allowable memory capacity information 102 indicating the decodable maximum allowable memory capacity.

The operation of the encoding and decoding apparatus will now be described. The decoding device 2 determines the decodable maximum allowable memory capacity of the picture memory 15. Therefore, for the decoding device 2 to decode the coded bit stream 101 as coded and outputted by the encoding device 1, the encoding device 1 must carry out coding operations based on the maximum allowable memory capacity information 102 outputted from the decoding device 2.

Thus, the encoding device 1 carries out iterated function coding on the digitized input picture data 100 within a range determined by the maximum allowable memory capacity information 102. This iterated function coding will be later described in detail.

Figure 2:
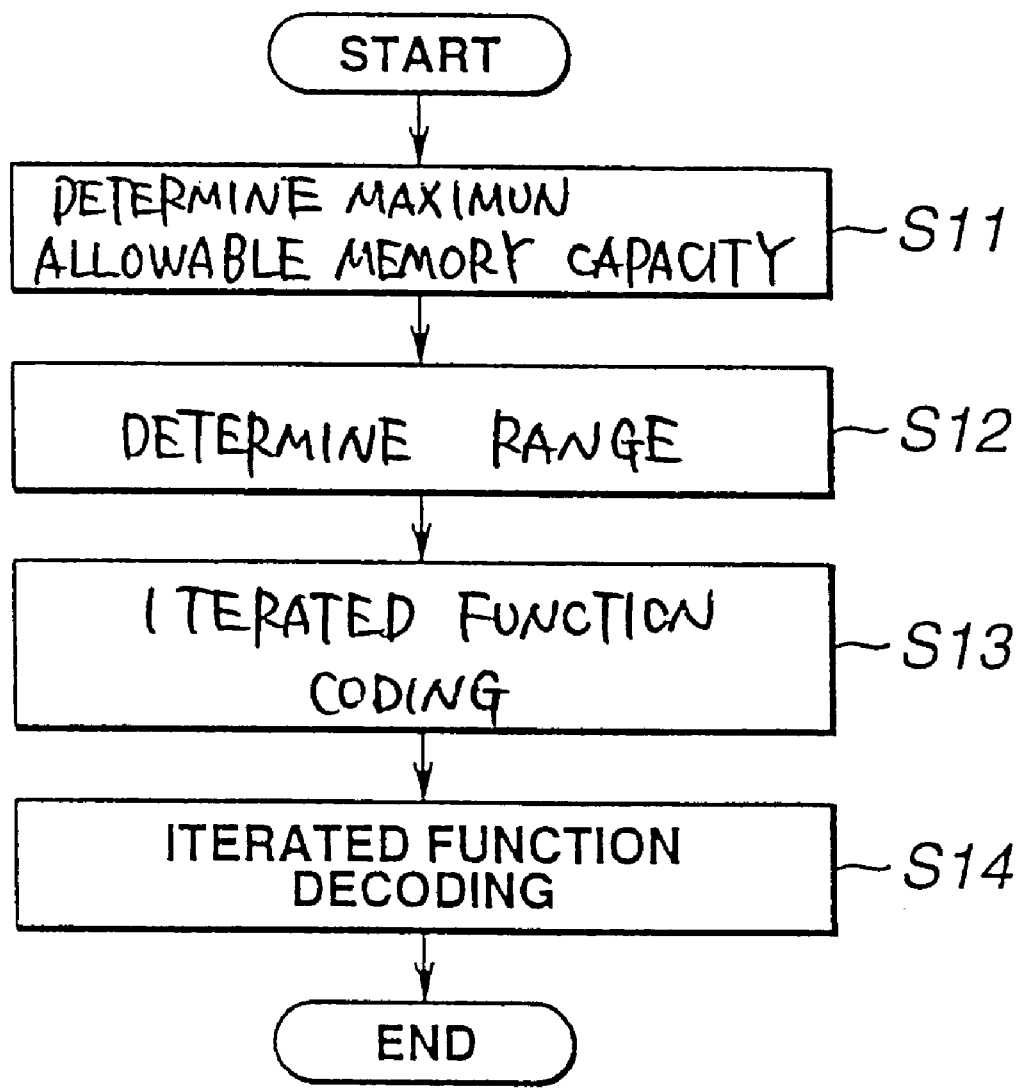
FIG. 2 is a flow chart according to an encoding and decoding method.

A series of processes for the encoding and decoding device will now be described with reference to the flow chart of FIG. 2. At step S11, decodable maximum allowable memory capacity of the picture memory 15 is determined by the maximum allowable memory capacity determining unit 140; and the maximum allowable memory capacity information 102 indicating the decodable maximum allowable memory capacity is provided to the encoding device 1. Then at step S12, a range of the input picture to be coded is determined in accordance with the provided maximum allowable memory capacity information 102 by the search range determining unit 9; and the search range information 114 is provided to the picture memory 6. At the subsequent step S13, the input picture data in the range supplied from the picture memory 6 is coded into a coded bit stream by the iterated function coding unit 3. As a result, the coded bit stream 101 is provided to the decoding device 2. Then, the operation proceeds to step S14. At step S14, the coded bit stream from the encoding device 1 is decoded by the iterated function decoding unit 4 to generate a decoded picture.

Figure 3:
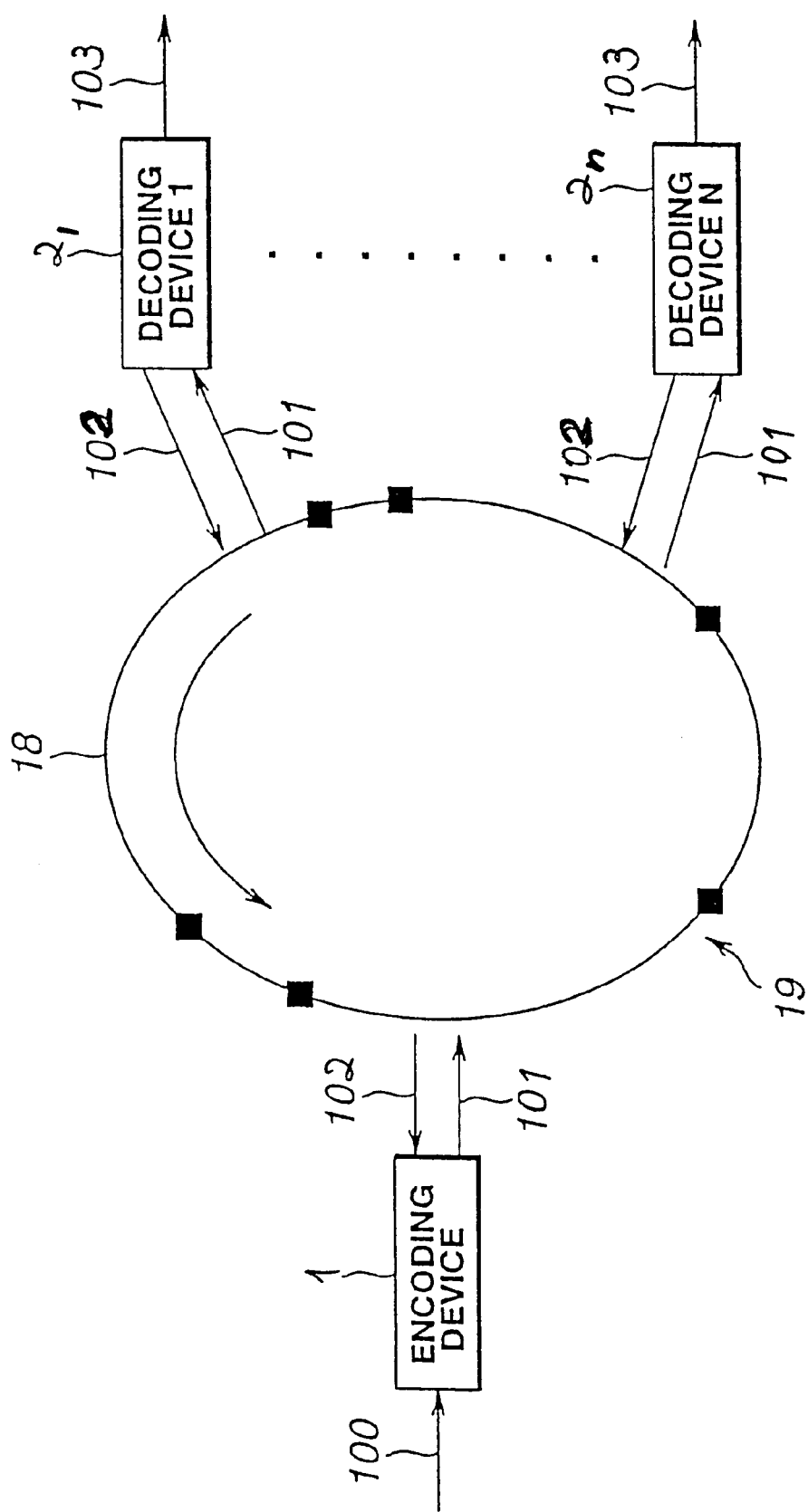
FIG. 3 is a block diagram of a representative information signal transmission device.

An information signal transmission device for transmitting information signals (coded bit stream) using a network will now be described with reference to FIG. 3. The information signal transmission device according to the present invention includes encoding device 1 which codes picture data 100 to generate the coded bit stream 101 and transmit it over network 18, first decoding device $2_1$, which decodes the coded bit stream 101 by receiving the coded bit stream from the network 18 to generate the decoded picture 103, N-th decoding device $2_n$ which performs the same function as the first decoding device $2_1$, and the network 18 which is connected to the first encoding device 1, the first decoding device $2_1$ and the N-th decoding device $2_n$, for transferring the coded bit stream 101 and other information signals. The structure of the first encoding device 1 is same as the encoding device 1 of FIG. 1 and the structure of the first and N-th decoding devices $2_1$, $2_n$ is the same as the decoding device 2 of FIG. 1.

The operation of the information signal transmission device of FIG. 3 will now be described. From a decoding device of the plurality of decoding devices on the network 18, the maximum allowable memory capacity information 102 indicating a maximum allowable memory capacity of the picture memory 15 in the decoding device is outputted to the network 18. For example, in the case where decoding is carried out by the N-th decoding device $2_n$, the maximum allowable memory capacity information 102 from the N-th decoding device $2_n$ is transmitted to the network 18 and then is provided to the encoding device 1.

The encoding device 1 which has received the maximum allowable memory capacity information 102 carries out the iterated function coding based on the received information and generates the coded bit stream 101. The encoding device 1 then transmits the coded bit stream 101 onto the network 18. The coded bit stream 101 is provided to the N-th decoding device $2_n$, and the N-th decoding device $2_n$ decodes and outputs the decoded picture data 103.

The received data on the network 18 is often transmitted in the form of packetized transmission data (packets) 19, for efficiency.

An information signal transmission device using the network according to another embodiment of the present invention will be described with reference to FIG. 4. This information signal transmission device includes encoding device 5 which encodes picture data 100 to generate the coded bit stream 101 and to transmit it over the network 18, first decoding device $2_1$ which decodes the coded bit stream 101 received from the network 18 to generate the decoded picture data 103, N-th decoding device $2_n$ which performs the same function as the first decoding device $2_1$, the network 18 which is connected to the encoding device 5, the first decoding device $2_1$ and the N-th decoding device $2_n$ for carrying the coded bit stream 101 and other information signals, and a decoding device selector 20 which selects the decoding devices. The structure of the first and N-th decoding devices $2_1$, $2_n$ is the same as the decoding device 2 of FIG. 1. However, the structure of the encoding device 5 is different than the encoding device 1 of FIG. 1. That is, as described above with reference to FIG. 1, the encoding device 1 receives the maximum allowable memory capacity information 102 from a certain decoding device 2; but the encoding device 5 of FIG. 4 outputs maximum allowable memory capacity information 131 indicating a maximum allowable memory capacity of the picture memory located therein, that is, in the encoding device 5. The detailed structure of the encoding device will be described hereinbelow.

The operation of this information signal transmission device will now be described. The encoding device 5 inputs the original picture data 100 in a step-wise manner in accordance with the capacity of the picture memory therein, and codes the original picture data 100 using iterated function coding. The obtained coded bit stream 101 and the maximum allowable memory capacity information 131 indicating maximum allowable memory capacity of the picture memory in the encoding device 5 are transmitted to the network 18 as shown in FIG. 4.

Each of the first and N-th decoding devices $2_1$, $2_n$ transmits maximum allowable memory capacity information 102 indicating maximum allowable memory capacity of their respective picture memory 15 to the network 18.

Figure 4:
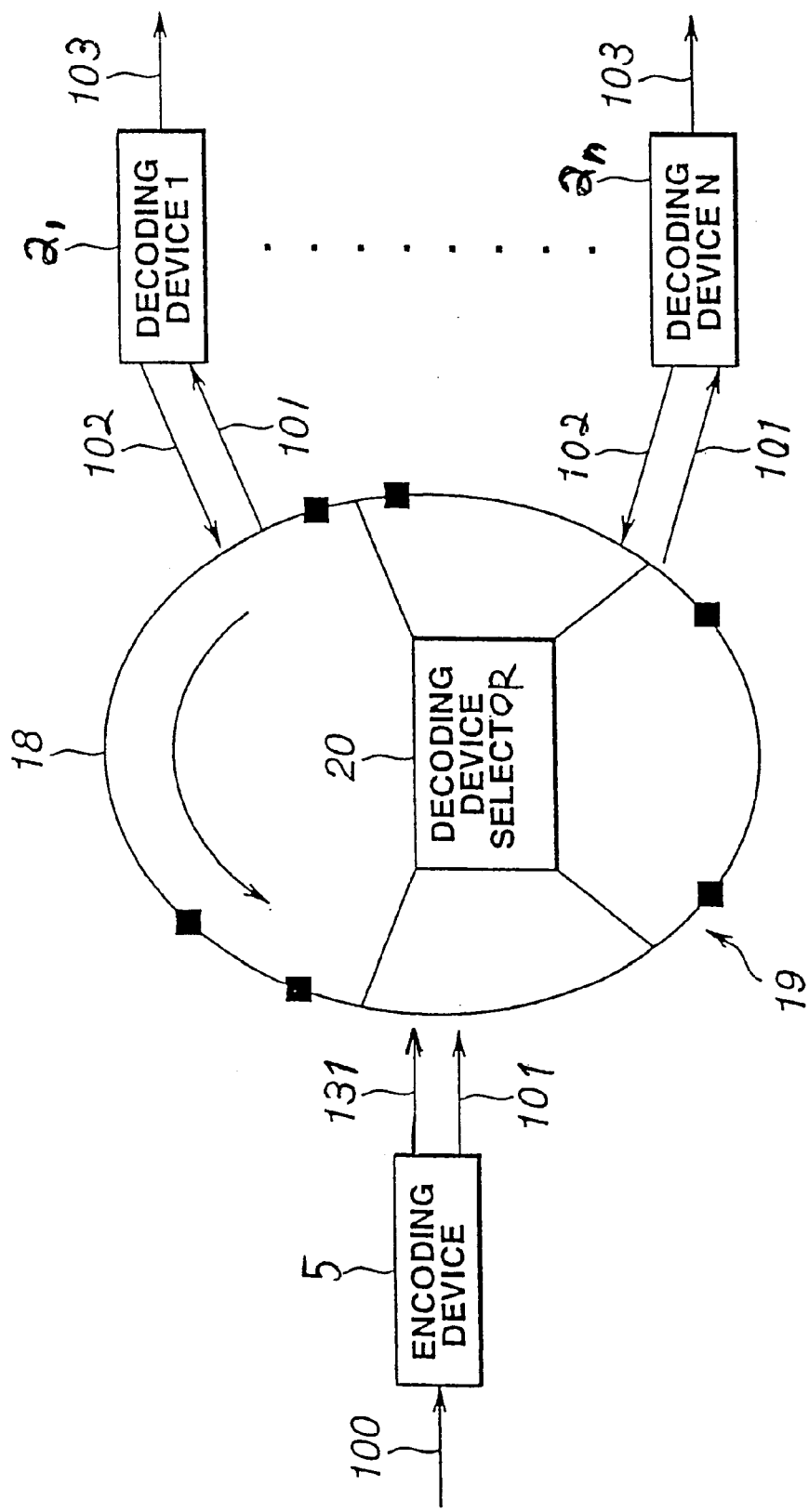
FIG. 4 is a block diagram of another representative information signal transmission device.

FIG. 4 also illustrates the decoding device selector 20 provided on the network 18. The maximum allowable memory capacity information 131 from the encoding device 5 and maximum allowable memory capacity information 102 from the decoding devices $2_1$, $2_n$ are compared, and the decoding device having the maximum allowable memory capacity of the encoding device 5 is selected by the decoding device selector 20. The coded bit stream 101 is then transmitted to the decoding device selected by the decoding device selector 20 through the network 18. The coded bit stream 101 is provided to the selected decoding device, and then the decoded picture data 103 is decoded and outputted therefrom.

Figure 5:
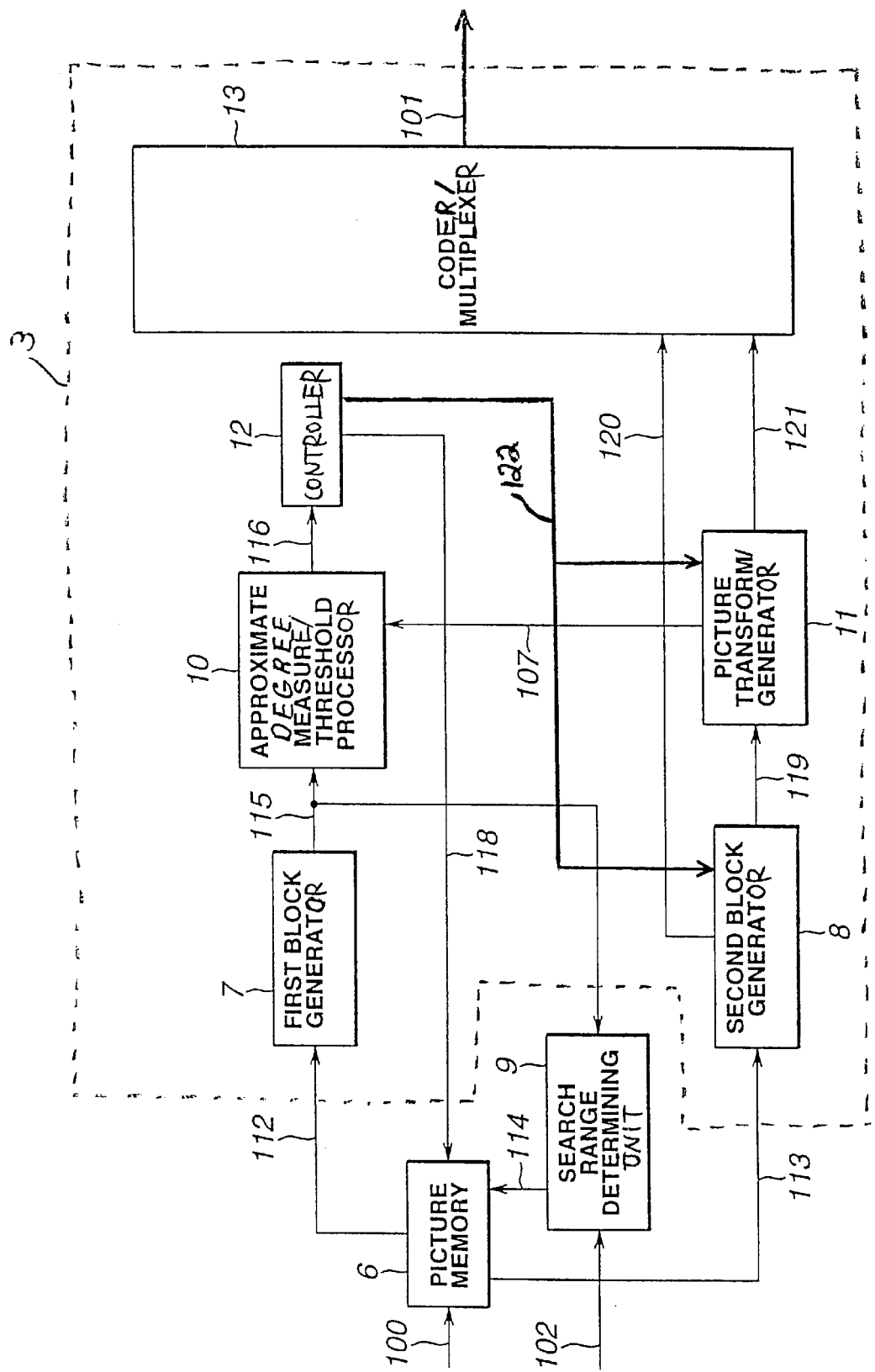
FIG. 5 is a block diagram of an encoding device according to the first embodiment.

The first embodiment of the encoding device will now be described with reference to FIG. 5. According to this embodiment, the encoding device includes picture memory 6 into which input picture data 100 is stored, search range determining unit 9 for determining a search range for use in performing iterated function coding based on maximum allowable memory capacity information 102 supplied from an external device and for controlling the reading operation from the picture memory 6 by control signal 114, and iterated function coding unit 3 for performing the iterated function coding to generate coded bit stream 101. The iterated function coding unit 3 has first block generator 7 for generating first block picture data 115 from the picture data 112 read out from the picture memory 6, and second block generator 8 for generating second block picture data 119 from the picture data 113 read out from the picture memory 6. In the preferred embodiment, the second block picture data is twice the size of the first block picture data.

The iterated function coding unit 3 also includes picture transform/generator 11 for mapping the second block picture data 119 to generate transformed second block picture data 107, approximate degree measure/threshold processor 10 for measuring the approximate degree of similarity between the transformed second block picture data 107 and the picture data 112, for processing the threshold value and for selecting the second block picture data most similar to the first block picture data.

The iterated function coding unit 3 further includes controller 12 for controlling the reading of picture data from the picture memory 6 on the basis of a control signal 116 from the approximate degree measure/threshold processor 10, and code/multiplexer 13 for coding/multiplexing the number or address 120 of the selected second block picture data and the transformation parameters 121, and for outputting the coded bit stream 101.

Figure 6:
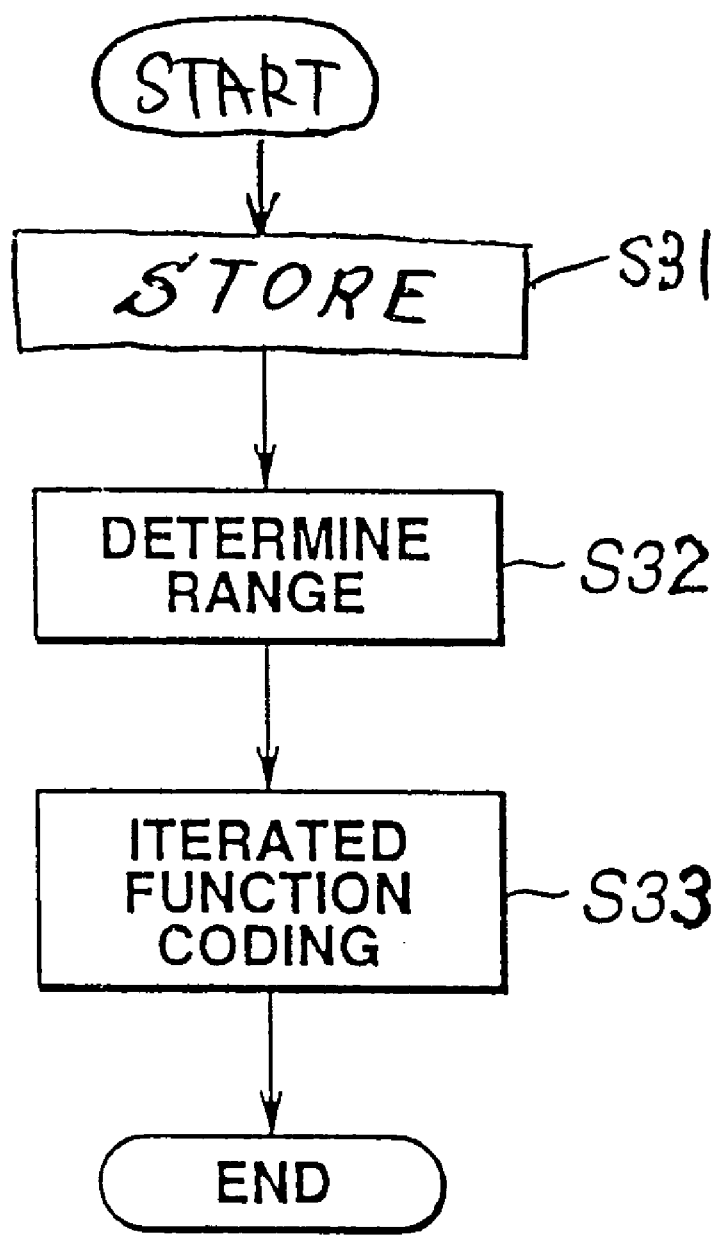
FIG. 6 is a flow chart of the encoding method according to the first embodiment of the encoding device.

The operation of the first embodiment of the encoding device will now be described with reference to the flow chart of FIG. 6. At step S31, input picture data 100 is stored in the picture memory 6. At step S32, the search range determining unit 9, to which maximum allowable memory capacity information 102 indicating maximum allowable memory capacity of the decoder memory is supplied from an external device, such as a decoding device, calculates a search range in the approximate block search area in accordance with the received maximum allowable memory capacity information 102. For example, in the case where the maximum allowable memory capacity is 100 Kbits, an area defined by 316 longitudinal lines and 316 lateral bits is the maximum allowable search range, since 100 Kbits=316 bits×316 lines. The operation then proceeds to step S33.

At step S33, the iterated function coding operation is performed based on the determined maximum allowable search range; and the coded bit stream is produced.

The operation of iterated function coding unit 3 corresponding to step S33 in FIG. 6 will be described with reference to the flow chart of FIG. 7. At step S21, under the control of the controller 12 using control signal 118, picture data 112 is supplied from the picture memory 6 to the first block generator 7. Further, under the control of the search range determining unit 9 using control signal 114, picture data 113, corresponding to the search range based on a position of the first block picture data 115 and the maximum allowable memory capacity information 102, is provided to the second block generator 8 from the picture memory 6. Then, the first block generator 7 generates first block picture 115 from the picture data 112. Similarly, the second block generator 8 generates second block picture data 119 from picture data 113 corresponding to the search area. At the subsequent step S22, the second block picture data 119 is mapped by the picture transform/generator 11, and transformed second block picture data 107 is generated. Then, the operation proceeds to step S23.

The mapping transform will be explained in detail below in the description of the basic theory of iterated function coding.

Figure 7:
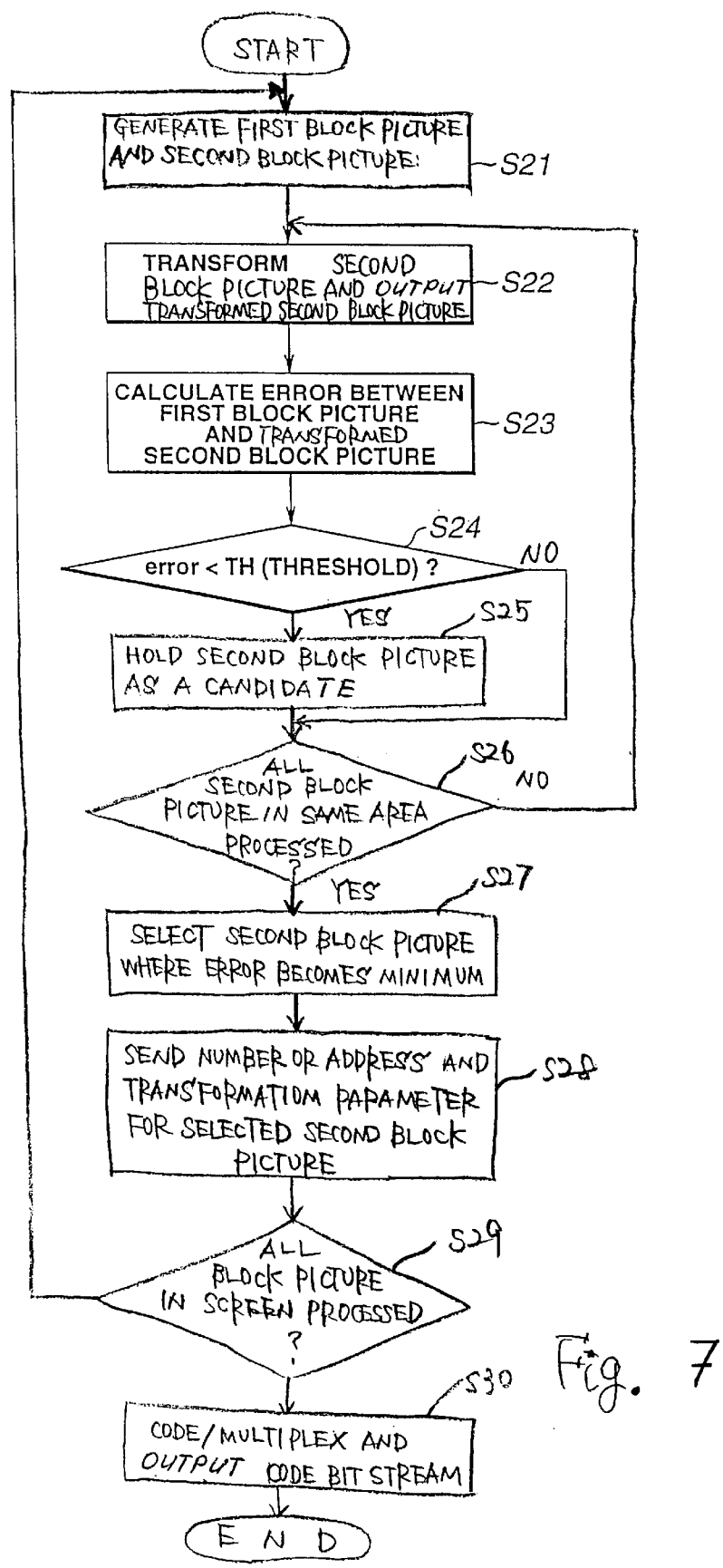
FIG. 7 is a detailed flow chart of the iterated function coding of FIG. 6.

Continuing with the description of FIG. 7, at step S23, the approximate degree measure/threshold processor 10 calculates the error, that is, the approximate degree of similarity between the transformed second block picture data 107 and the first block picture data 115. At the subsequent step S24, the calculated approximate degree of similarity is compared with a preselected threshold value (TH). If the error is smaller than the threshold value, that is, error<TH, "YES" decision is obtained and the operation proceeds to step S25. At step S25, the second block data is selected as a candidate under the control of the controller 12 using control signal 122, and the operation proceeds to step S26. If the above condition (error<TH) is not satisfied, "NO" decision is obtained and the operation proceeds to step S26.

At step S26, whether processing of all second block picture data in the search area is completed or not is determined. If processing of all second block picture data is completed, "YES" decision is obtained and the operation proceeds to step S27. If not, "NO" decision is obtained and the operation returns to step S22 and then the same operation is performed for the next second block picture data. At step S27, the second block picture data at the time when the error from the first block picture data becomes minimum is selected by the controller 12 with the control signal 122 from among all of the second block picture data selected as candidates; and the operation proceeds to step S28. At step S28, a number or address 120 as position information and transform parameters 121 of the selected second block picture data are transmitted to the coder/multiplexer 13. The operation then proceeds to step S29. At step S29, whether processing of all the first block picture data is completed or not is discriminated. If processing of all first block picture data is completed, the operation proceeds to step S30. If not, the operation returns to step S21 and then the same operation is performed for the next first block picture data.

At step S30, the number or address 120 and transform parameters 121 of the selected second block picture data having the highest approximate degree of similarity are coded and multiplexed in order of a number or address of the first block picture data, and are then transmitted as coded bit stream 101 from the coder/multiplexer 13.

The detailed operation of the search range determining unit 9 will now be described. The search range determining unit 9 determines a target search range on the basis of the position of the first block picture data as a current coding target block, from the first block picture data 115, and the maximum allowable memory capacity information 102 and outputs the search range value (a control signal) 114 to the picture memory 6.

For example, if the picture size of the original picture is 720 pixels×720 lines and the maximum allowable memory capacity information is 100 Kbits as described above, the number of split screens calculated from the maximum allowable memory capacity information is two in the lateral direction and two in the longitudinal direction, that is, four in total. Therefore, as shown in FIG. 8, the number of screens of the input picture is four, from an area 1 to an area 4.

The picture data 113 from the area designated by the search range value 114 is outputted from the picture memory 6 to the second block generator 8.

Figure 8:
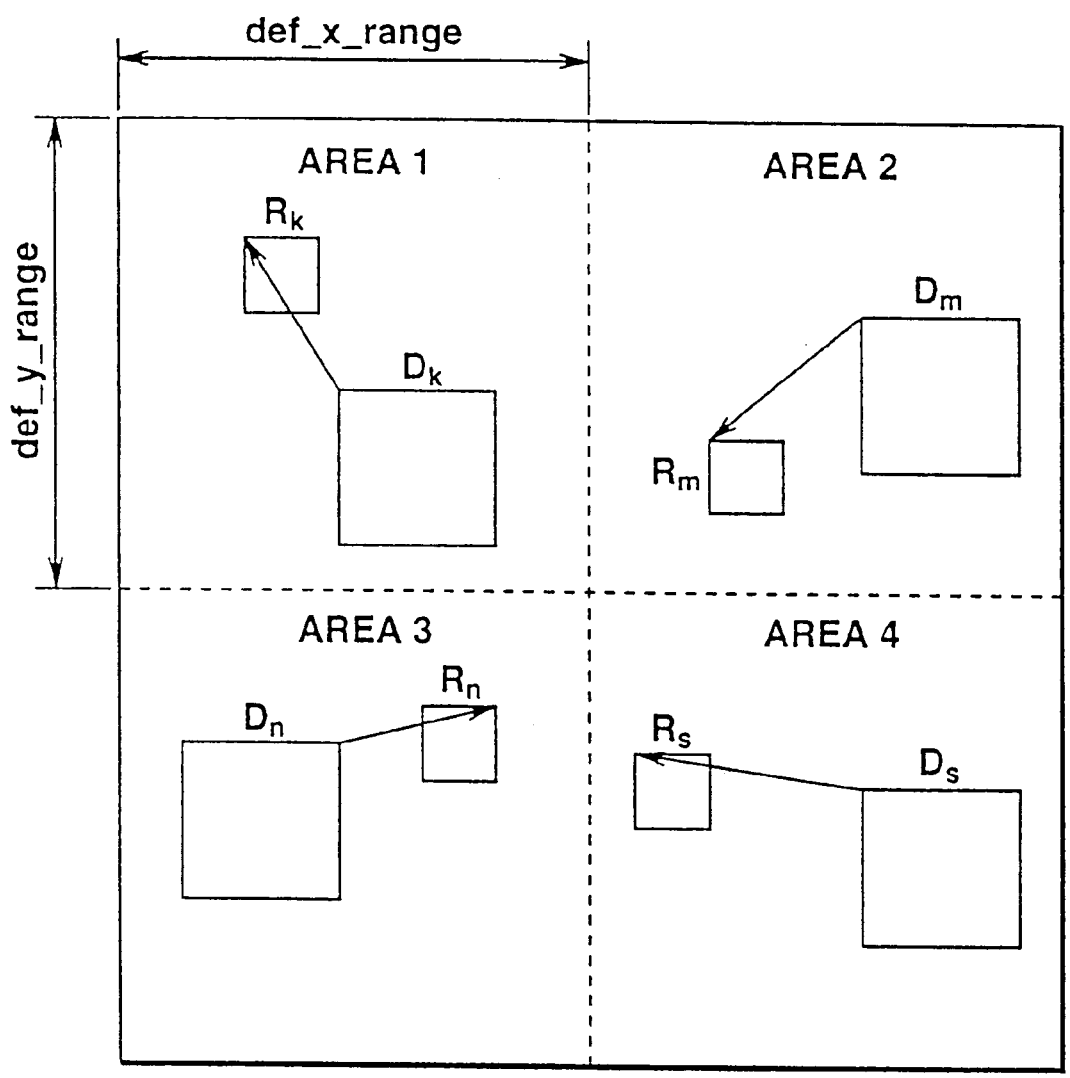
FIG. 8 shows a mapping relationship between blocks in a picture.

As shown in FIG. 8, for example, if the first block picture is $R_m$, the search range value 114 indicates the range of the area 2, and the picture data 113 in the same range is read out from the picture memory 6.

Each part will now be described in detail. First, the basic theory of iterated function coding/decoding as a fundamental technique of the embodiment of the present invention will be described with reference to FIG. 9.

Iterated function coding is a technique for picture coding by iteratively carrying out contractive (reduced) mapping from a domain block to a range block with respect to all the range blocks constituting the screen (picture). At this point, the position information and transform parameter of the most approximate domain block may be coded with respect to each range block.

Figure 9:
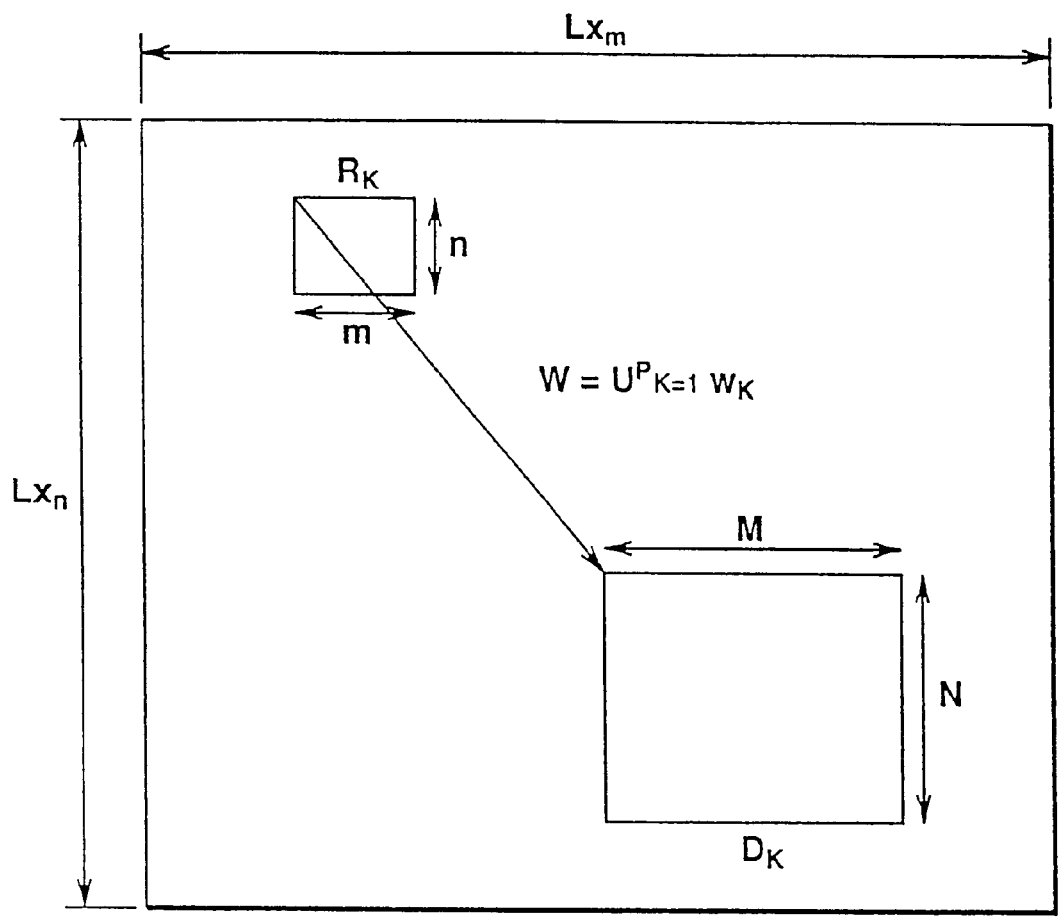
FIG. 9 shows mapping between blocks according to iterated function coding.

In FIG. 9, a range block $R_k$ corresponds to the first block picture data 115 and a domain block $D_k$ corresponds to the second block picture data 119. The block size of the range block $R_k$ is defined as m×n, and the block size of the domain block $D_k$ is defined as M×N. In FIG. 9, it is indicated that L×L units of range block data exist in this picture. The block sizes of the range block and the domain block are elements which affect the coding efficiency, and therefore, determination of the block sizes is important.

Block picture transformation carried out by the picture transform/generator 11 is to transform the domain block $D_k$ to the range block $R_k$. If the mapping function for a block k is wk and the number of blocks of the second block picture required for mapping transform of the entire screen is P, a picture f is mapped by a mapping function W of the entire picture in the following manner.

$$W(f) = w_1(f) \cup W_2(f) \cup \ldots \cup w_p(f) \quad (1)$$

Therefore, W is expressed by the following equation.

$$W = \cup^P_{k=1} W_k \quad (2)$$

As the mapping function W, any function may be selected as long as it converges. To ensure convergence, contraction mapping is typically used. In addition, affine transform is often used to simplify the processing.

The case where the domain block $D_k$ is mapped to the range block $R_k$ by affine transform is expressed by the following equation, where an actual transform function is $v_i$.

$$v_i(x, y) = \begin{bmatrix} a_i & b_i \\ c_i & d_i \end{bmatrix} \begin{bmatrix} x \\ y \end{bmatrix} + \begin{bmatrix} e_i \\ f_i \end{bmatrix} \quad (3)$$

By this Equation (3), all transforms for rotation, lateral and horizontal movement, reduction, and enlargement between two blocks may be expressed.

While the above-described transform is for spatial coordinates, mapping transform may be carried out similarly by using affine transform with respect to the pixel value related to the density value such as luminance or color difference information. In this case, for simplification, a relational expression of mapping a pixel value $d_i$ in $D_k$ to a pixel value $r_i$ in $R_k$ may be shown as follows:

$$V_i(d_i) = c \times d_i + b \quad (4)$$

In this Equation (4), c may be defined as the contrast and b may be defined as the brightness.

In this case, the parameters c and b which realize the minimum square sum of difference from the pixel value $r_i$ in the range block $R_k$ may be calculated in the following manner.

$$\Sigma(c \times d_i + b - r_i)^2 \rightarrow \text{minimum value} \quad (5)$$

The picture transform/generator 11 includes a circuit for carrying out a series of affine transforms such as rotation, lateral and horizontal movement, reduction and enlargement expressed by the Equation (3), and carries out positional transform within the screen with respect to the second block picture data 119.

In FIG. 9, the domain block $D_k$ located in the lower right part of the screen is mapped to the range block $R_k$ located in the upper left part of the screen. As a transform method for the density value of the pixel in the block, affine transform may be similarly used.

Specifically, with respect to the second block picture data 119, transform processing is carried out while changing the transform coefficients ($a_i$, $b_i$, $c_i$, $d_i$, $e_i$, $f_i$) of the Equation (3) to various sets, thereby obtaining the transformed second block picture data 107. Then, the approximate degree of similarity between the transformed second block picture data 107 and the first block picture data 115 is measured.

As a method for measuring the approximate degree of similarity, the sum of absolute value of errors between these block pictures may be employed.

Figure 10:
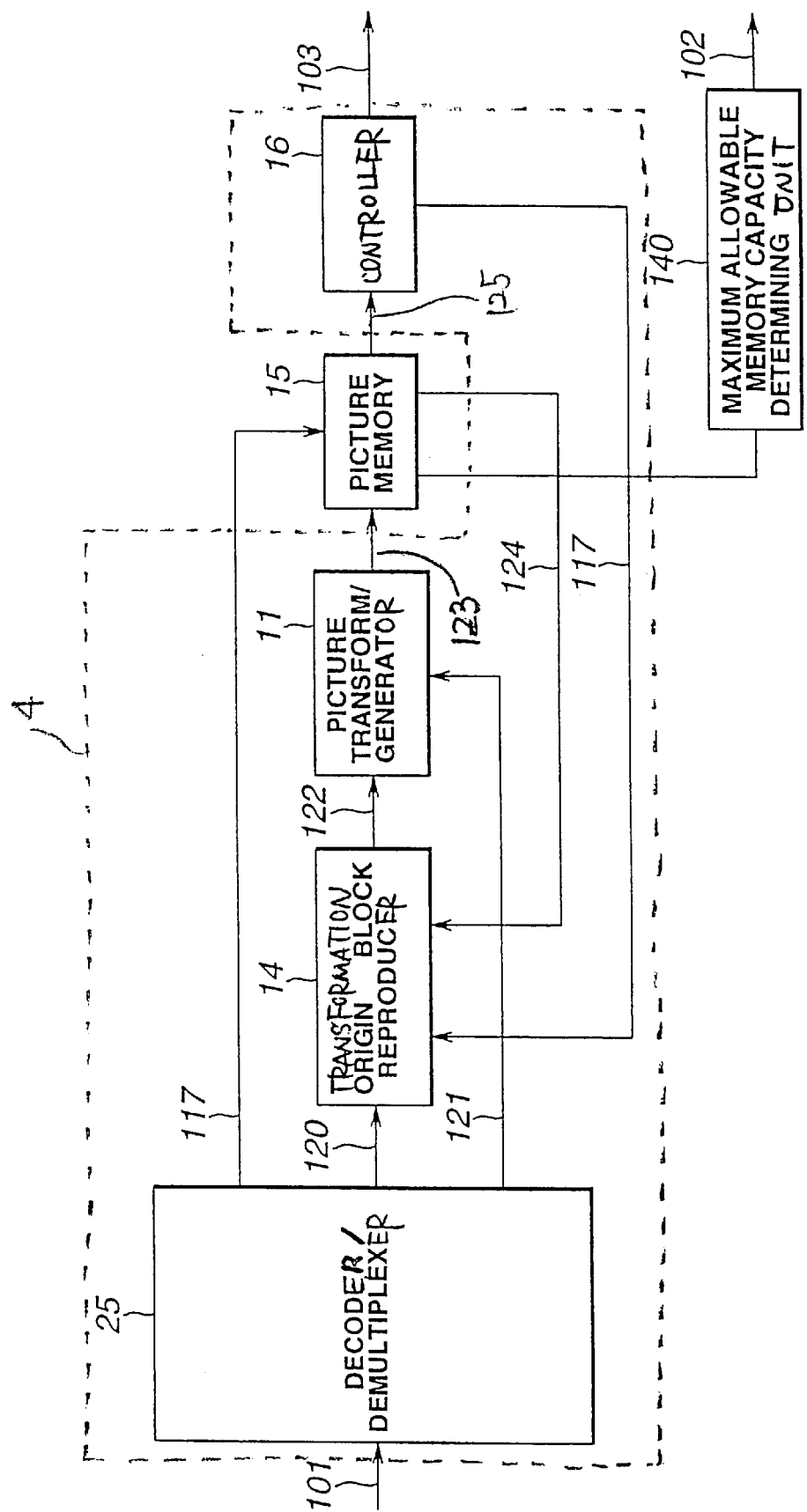
FIG. 10 is a block diagram of a decoding device.

An embodiment of the decoding device will now be described with reference to FIG. 10. The decoding device includes iterated function decoding unit 4 which receives and performs iterated function decoding of a coded bit stream to generate a decoded picture, picture memory 15 which stores the decoded picture processed by the iterated function decoding and maximum allowable memory capacity determining unit 140 which generates maximum allowable memory capacity information 102 indicating a maximum allowable memory capacity of the picture memory 15.

The iterated function decoding unit 4 includes decoder/demultiplexer 25 which decodes and demultiplexes the received coded bit stream and generates a number or address 117 of the first block picture, a number or address 120 of the second block picture and transformation parameter 121. Transformation origin block reproducer 14 reproduces transformation origin block picture data 122 from picture data 124 supplied by the picture memory 15 based on the number or address 120 of the second block picture. Picture transform/generator 11 carries out mapping transform on the transformation origin block picture data 122 reproduced by the transformation origin block reproducer 14 based on the transformation parameter 121 and provides the picture memory 15 with the transformed block picture 123. Controller 16 controls iterated function decoding until a number of the iterated function decoding operations reaches a predetermined number.

Figure 11:
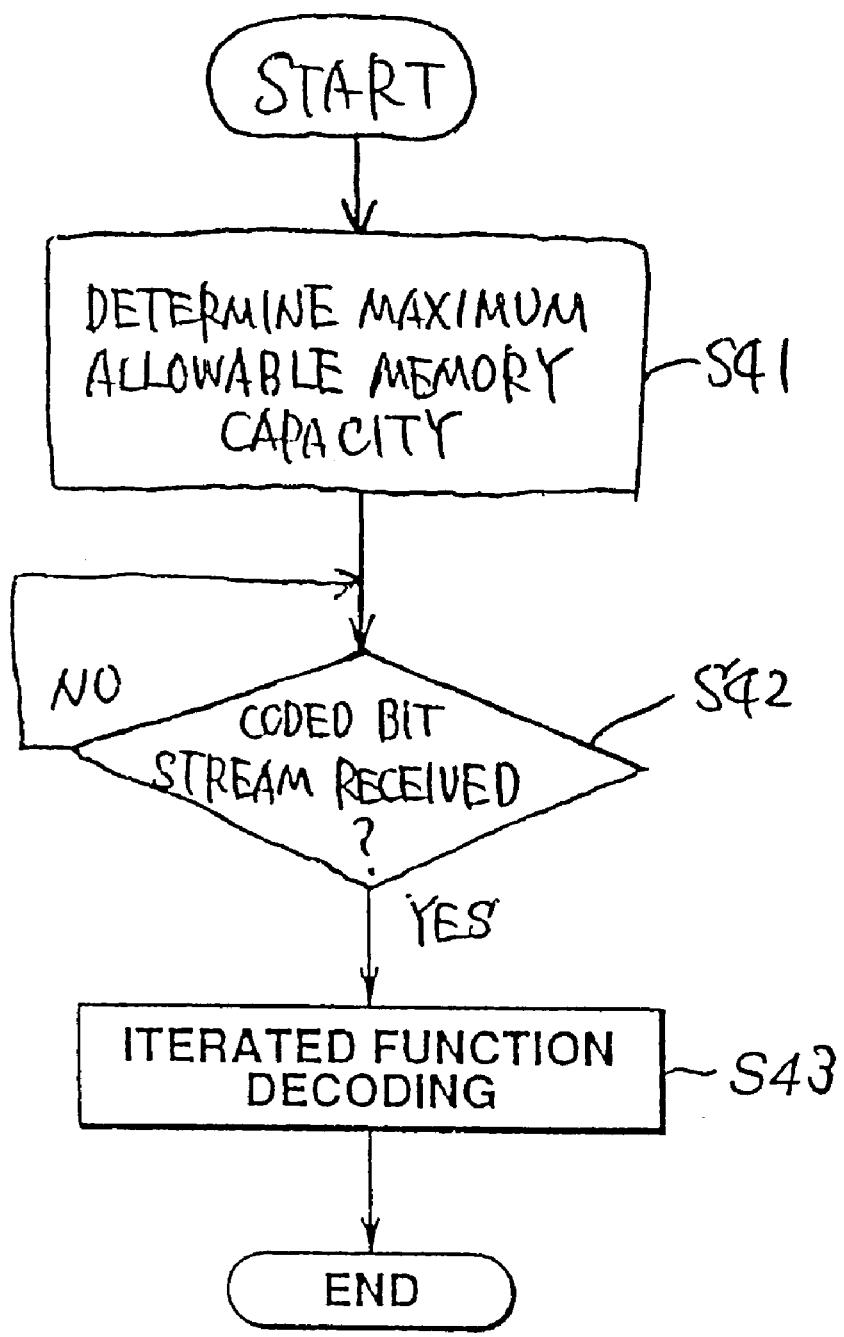
FIG. 11 is a flow chart for a decoding method.

An operation of the decoding device will now be described with reference to the flow chart of FIG. 11. At step S41, maximum allowable memory capacity information 102 as the maximum decodable capacity of the picture memory 15 for storing picture data to be decoded is calculated, and transmitted to an external encoding device over the network. Then the operation of the decoding device proceeds to step S42. At step S42, whether or not the coded bit stream from the encoding device has been received is discriminated. If the coded bit stream is received, the operation proceeds to step S43. If not, the process is in wait state. At step S43, the iterated function operation of the decoding device is performed on the coded bit stream using the picture memory, and then the decoded picture is outputted.

Figure 12:
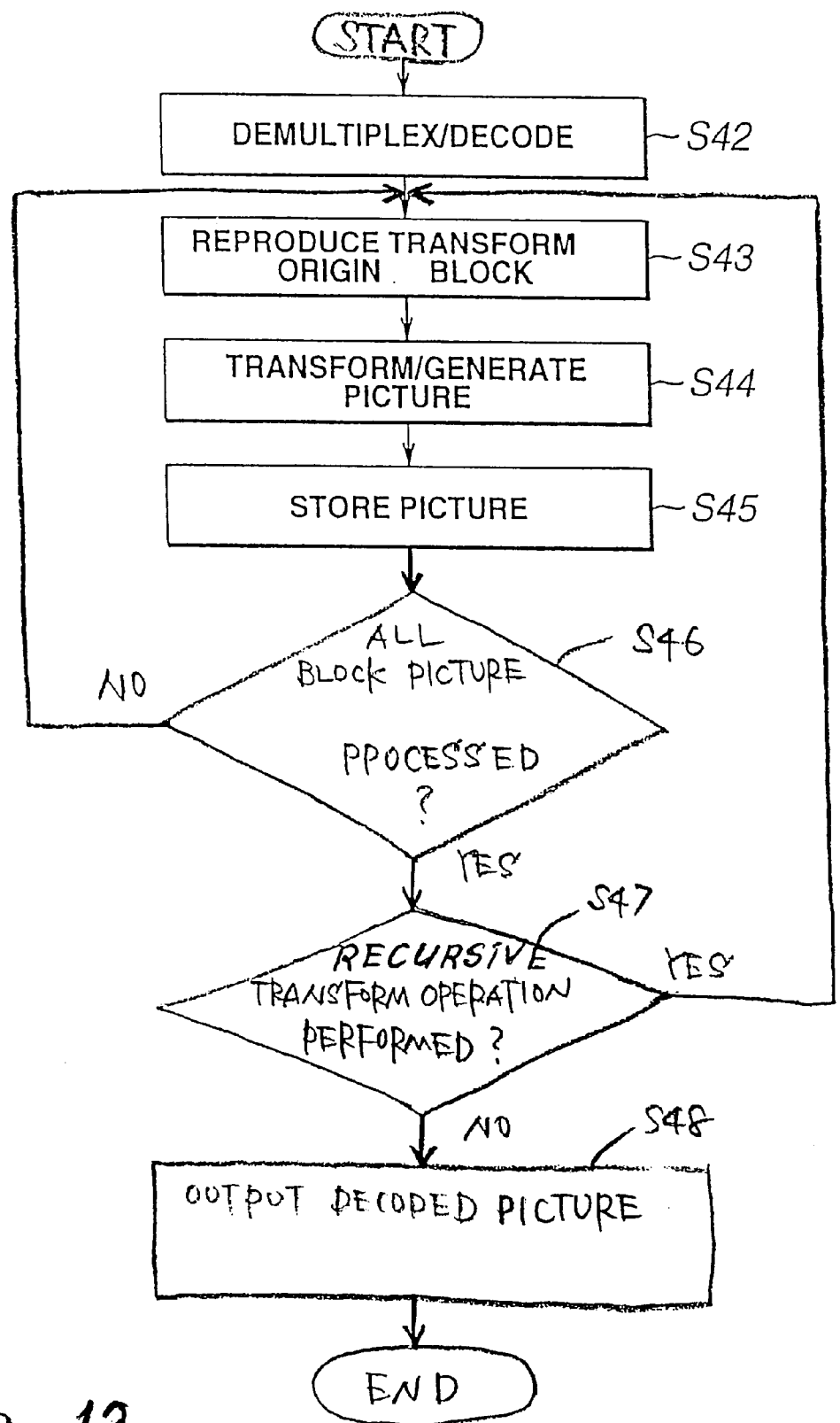
FIG. 12 is a flow chart of iterated function decoding in the decoding operation.

Next, the operation of the iterated function decoding unit 4 corresponding to step S43 in FIG. 11 will be described with reference to FIG. 12. At step S42, coded bit stream 101 is decoded and demultiplexed by the decoder/demultiplexer 25 into code words to generated the following: a number or address 117 of the first block picture, a number or address 120 of the second block picture and transformation parameter 121. The operation proceeds to step S43. At step S43, on the basis of a number or address 120 as position information of the second block picture, transformation origin block data 122 is reproduced from picture data 124 from the picture memory 15 and then is provided to the picture transform/generator 11. At step S44, mapping transformation designated by transform parameter 121 is carried out by the picture transform/generator 11 with respect to the transformation origin block picture data 122 reproduced by the transformation origin block reproducer 14. Transformed block picture is thus generated. The operation proceeds to step S45. The transformed block picture data (decoded block picture) 123 is stored at the position of the number or address (position information) of the first block picture, in the picture memory 15. At step S46, whether or not the decoding operation for all the first block picture data in the picture screen have been processed is discriminated. If the decoding operation for all the first block picture data have been processed, the operation proceeds to step S47. Otherwise, the operation returns to step S43 and the same operation is performed for the next block picture data.

At step S47, whether or not the iterated transform operation must be continued is discriminated by the controller 16. That is, whether a number of iterated transform operations has reached a predetermined number is determined. If it is necessary to continue the iterated transform operation, that is, the preselected number of iterated transform operations is not reached, the control signal 117 is generated to the transformation origin block reproducer 14. The operation then returns to step S43. If the number of the iterated transform operations has reached the predetermined number, the process continues with step S48.

At step S48, finally decoded picture data 125 stored in the picture memory 15 is outputted by the controller 16 as decoded picture data 103.

Figure 13:
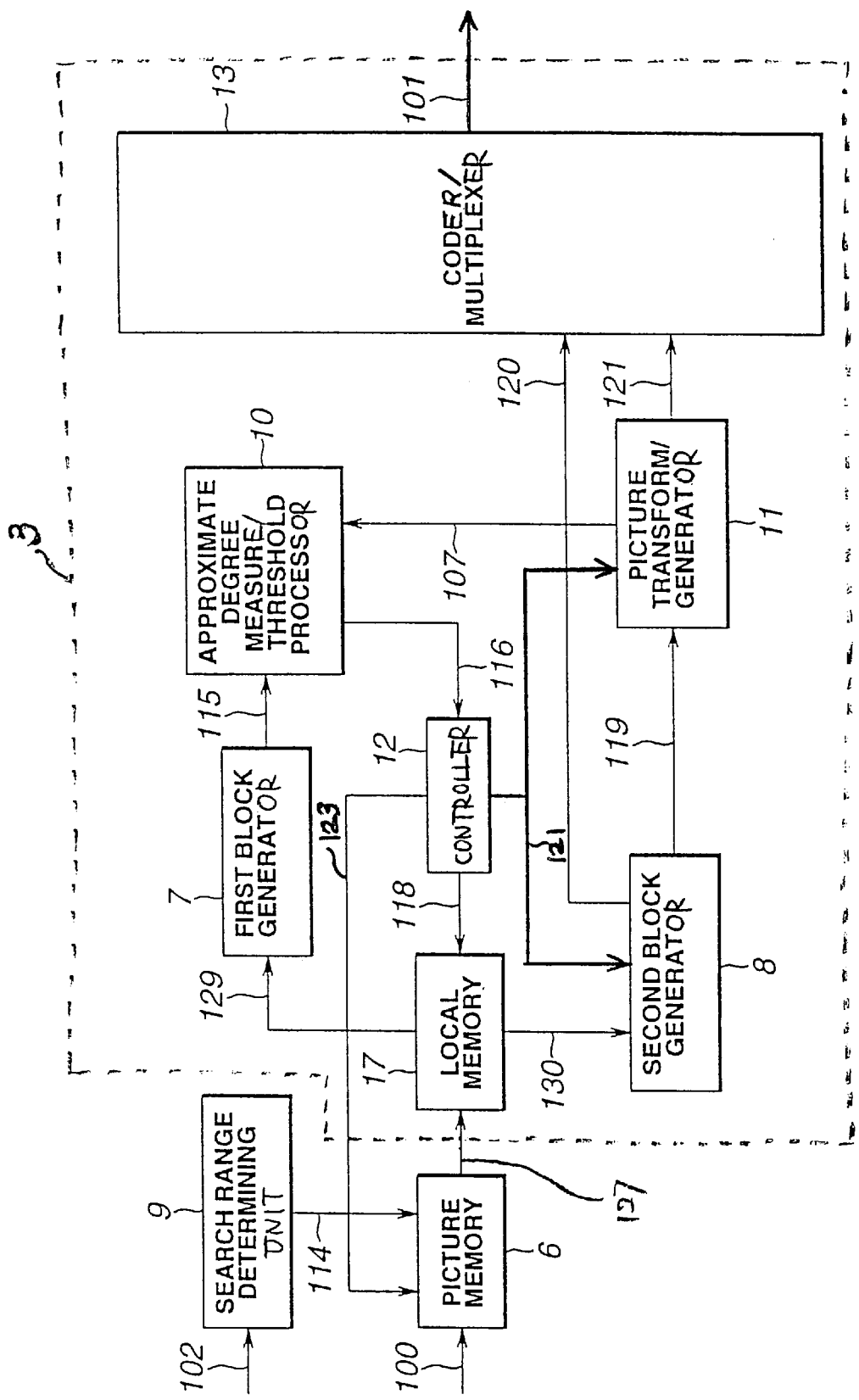
FIG. 13 is a block diagram of a second embodiment of the encoding device.

The second embodiment of the encoding device of FIGS. 1, 3 will now be described with reference to FIG. 13. The encoding device includes picture memory 6 in which input picture data 100 is stored, search range determining unit 9 for determining a search range when performing iterated function coding based on maximum allowable memory capacity information 102 and for controlling the picture memory 6, and iterated function coding unit 3 for performing iterated function coding and for generating coded bit stream 101. Different from the first encoding device, the iterated function coding unit 3 includes local memory 17 for temporarily storing the picture read out from the picture memory 6, such that the reading operation of picture data from the picture memory 6 is different from the first encoding device.

The iterated function coding unit 3 according to the second embodiment of the present invention includes first block generator 7 for generating first block picture data 115 from the picture data 129 retrieved from the local memory 17, and includes second block generator 8 for generating second block picture data 119 from the picture data 130 retrieved from the local memory 17.

The iterated function coding unit 3 also includes approximate degree measure/threshold processor 10 for measuring the approximate degree of similarity between a picture transformed by picture transform/generator 11 and the first block picture and for processing the threshold value, and picture transform/generator 11 for mapping the second block picture to generate transformed second block picture data 107.

The encoding device in the second embodiment further includes controller 12 for controlling reading of the picture from the picture memory 6 and from the local memory 17, and coder/multiplexer for coding/multiplexing and outputting numbers or addresses of the second block pictures and transformation parameters as the coded bit stream.

The operation of the second embodiment of the encoding device will now be described. The encoding device differs from the first embodiment of the encoding device in that area picture data 127 is sequentially transferred from the picture memory 6 to the local memory 17 in accordance with a search range value (control signal) 114 from the search range determining unit 9 and a control signal 123 from the controller 12.

For example, under the conditions of the allowable memory capacity and the picture size described in the first embodiment of the encoding device, four areas are sequentially read out from the picture memory 6 and temporarily stored in the local memory 17. After that, picture data 129 and picture data 130 read out from the local memory 17 under the control of the controller 12 using the control signal 118 are provided to the first block generator 7 and the second block generator 8 for generating first and second block picture data 115, 119, respectively. The processing subsequent thereto is the same as in the first embodiment of the encoding device.

The picture memory 6 and the local memory 17 are constituted by different memory types. Since the local memory 17 is more frequently accessed than the picture memory 6, high-speed memory such as SDRAM (Synchronous Dynamic Random Access Memory) may be used. Alternatively, a cache memory externally attached to a CPU (central processing unit) may be also used.

The third embodiment of the encoding device will be described with reference to FIG. 14. The third embodiment of the encoding device shows the structure of the encoding device 5 as shown in FIG. 4.

The encoding device according to the third embodiment includes local memory 17 for temporarily storing input picture data 100 and for supplying block picture data 129 to first block generator 7 and block picture data 130 to second block generator 8 under the control of controller 12 using the control signal 118 instead of the picture memory 6 and the search range determining unit 9 of the first embodiment of the encoding device.

Figure 14:
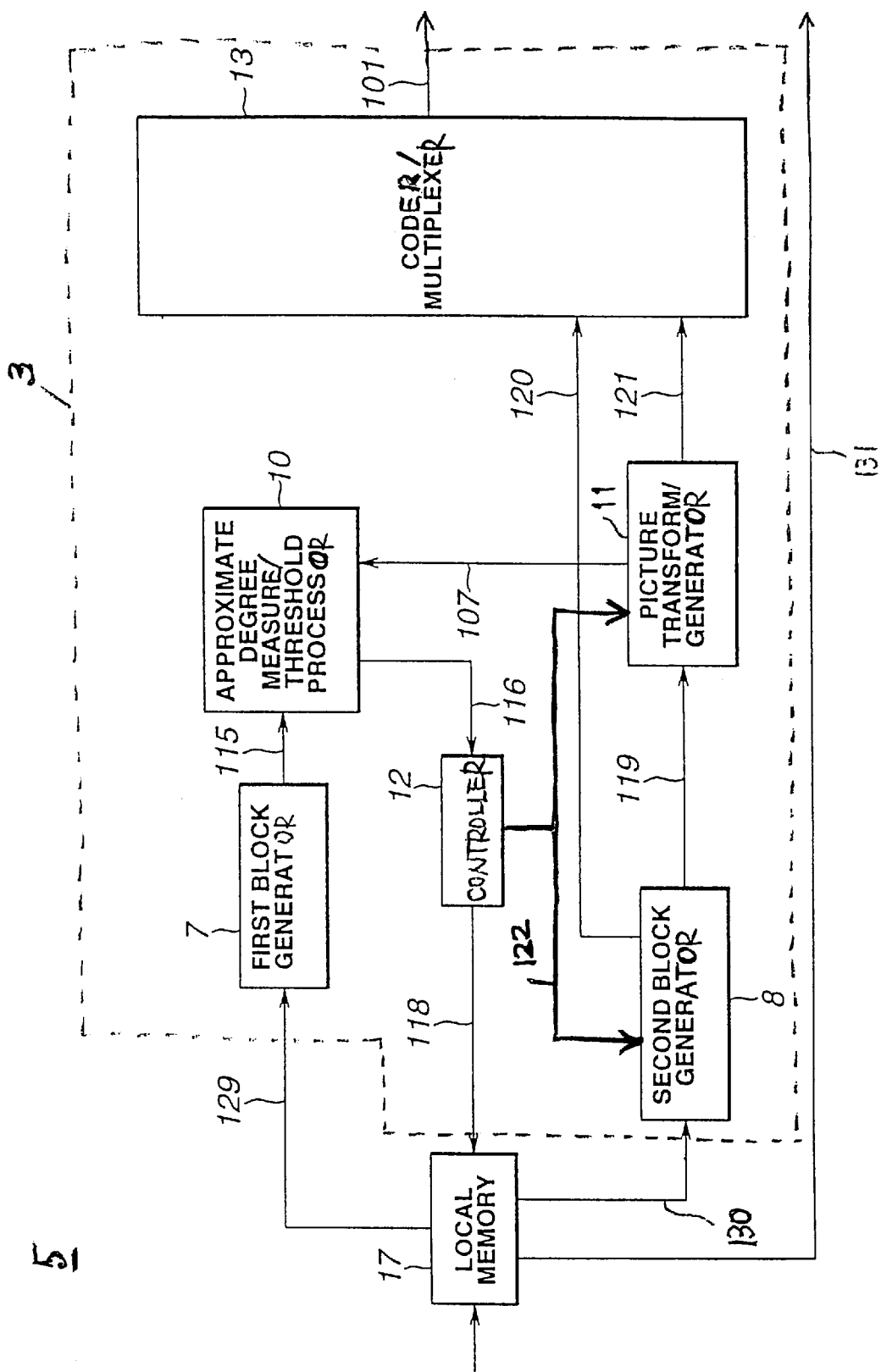
FIG. 14 is a block diagram of a third embodiment of the encoding device.
Figure 15:
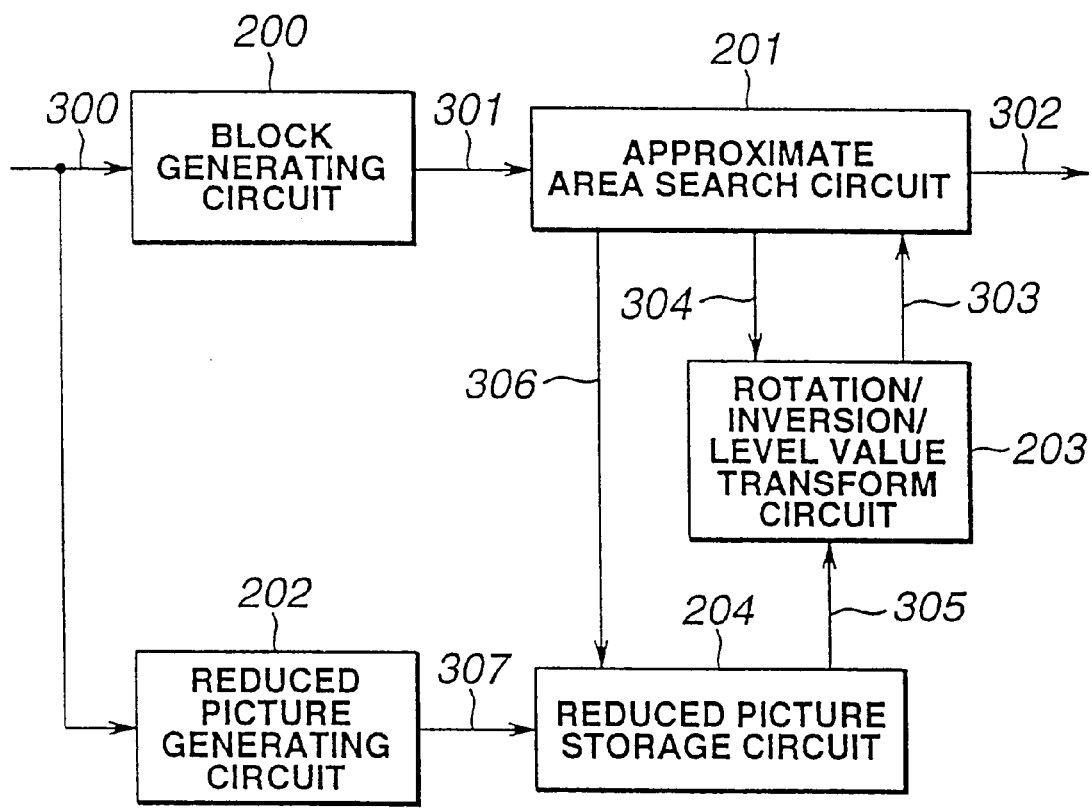
FIG. 15 is a block diagram of a conventional encoding device.
Figure 16:
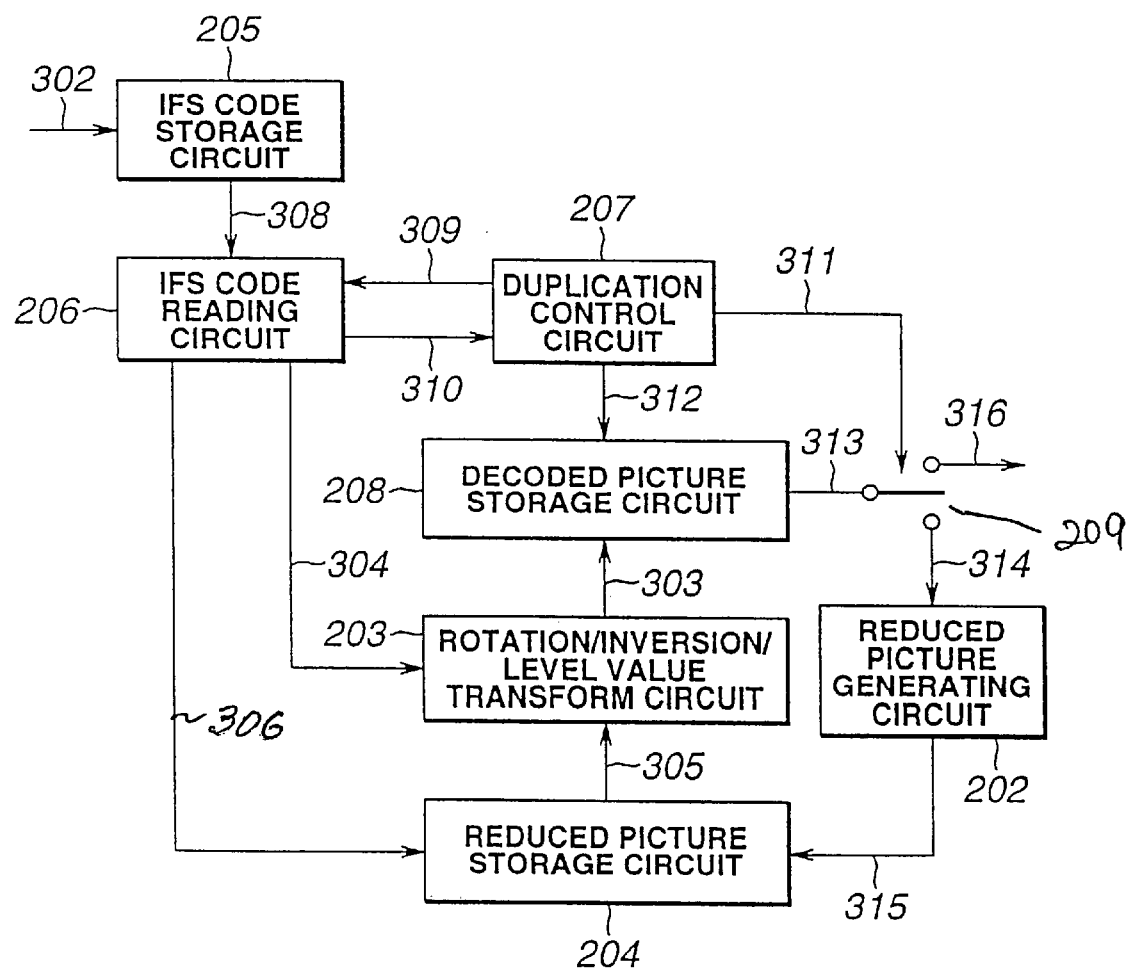
FIG. 16 is a block diagram of a conventional decoding device.

As shown in FIG. 14, the local memory 17 also generates maximum allowable memory capacity information 131 indicating maximum allowable memory capacity of the local memory 17 output to a network. The structure and operation of other elements in the third embodiment are the same as in the first or second embodiment of the encoding device, and the explanation thereof will be omitted.

The operation of the third embodiment of the encoding device will now be described. Only the local memory 17 having a relatively small memory capacity instead of the picture memory 6 is provided in the encoding device 5, and the memory capacity of the local memory 17 is transmitted from the encoding device to the network as maximum allowable memory capacity information 131 of this encoding device.

Block picture data 129, 130 read out from the local memory 17 are supplied to the first and second block generators 7, 8, respectively, for generating first block picture data 115 and second block picture data 119. The processing subsequent thereto is similar to that of the second embodiment of the encoding device.

While the encoding and decoding apparatus and method according to the present invention have been shown with respect to block diagrams, in addition to providing different physical elements for each block, the entire method and apparatus may be implemented on a multipurpose general computer being programmed for this use. In this regard, a recording medium, or other storage device, may contain operating instructions to perform each of the steps set forth in the methods noted above for encoding and decoding. It should also be noted that instead of a recording medium, a transmission channel connected to a communications network or the like may be provided to receive and transmit data from an encoder, and to decode the encoded data.

Specific embodiments of application of the encoding device and method, the decoding device and method, the encoding and decoding device and method, the information signal transmission device, and the recording medium include a digital video disk, a picture transmitting/receiving device, a picture database, a picture compressing/decoding device for the purpose of downloading a picture on the Internet, an electronic still camera, a game machine, an encoding/decoding device having a display unit which enables variable size display, or a software module realizing the same system.

As described above, in the encoding device and method, the decoding device and method, the encoding and decoding device and method, and the recording medium according to the present invention, even when a memory having a limited capacity for decoding is provided, the coding operation is carried out in advance in accordance with the memory capacity. Therefore, the memory capacity does not limit the coding operation, and scalable constitution may be realized. Additionally, since the reduction in memory capacity narrows the search range in the approximate block search for coding, high-speed operation may be performed.

In the present invention, a coding control is carried out by the encoding device on the basis of the maximum allowable memory capacity of the decoding device transmitted onto the network from one of iterated function decoders of a plurality of decoding devices existing on the network. Therefore, all of the decoding devices on the network may be effectively utilized. Also, if time-division processing is carried out by the encoding device, the efficiency may be further improved.

In addition, in the present invention, one iterated function decoder having the maximum allowable memory capacity which enables decoding of the coded bit stream transmitted from the encoding device is selected from the network. Therefore, coding control may be carried out within the range of the capacity of the picture memory provided in the encoding device, regardless of the allowable memory capacity of the decoding device. Thus, a network having a very high degree of freedom may be obtained. Also, the coded bit stream outputted from an inexpensive encoding device is not decoded by an expensive decoding device, and an inexpensive decoding device is selected to provide a decoded picture. Therefore, effective utilization of resources may be obtained.

What is claimed is:

1. A method for iterated function coding blocks in a picture, comprising the steps of:

storing an input picture in a first picture memory;

receiving capacity information indicating a maximum allowable memory capacity of a second picture memory to be used for performing an iterated function decoding of a coded picture corresponding to said input picture;

determining a search range in the stored input picture in accordance with the received maximum capacity information; and iterated function coding said blocks within the determined search range.

2. The method according to claim 1, further comprising storing a portion of said input picture within the determined search range in a local memory operating at a higher speed than the first picture memory.

3. The method according to claim 1, wherein said iterated function coding comprises generating a first picture block from said input picture, generating a plurality of second picture blocks from a portion of said input picture within the determined search range, transforming the second picture blocks according to a predetermined operation, determining a transformed second picture block that is the most similar to said first picture block, selecting a second picture block corresponding to the determined transformed second picture block, and outputting code position information indicating a position of the selected second picture block and outputting a transformation parameter representing the transformation of the selected second picture block.

4. A method for iterated function coding blocks in a picture, comprising the steps of:

storing an input picture in a picture memory;

generating capacity information indicating a maximum allowable memory capacity of said picture memory;

iterated function coding, by an encoding device, said blocks in said picture using said picture memory to generate a coded bit stream; and transmitting, from said encoding device, the generated coded bit stream and capacity information, wherein said capacity information is transmitted to another device that determines, based upon said capacity information, whether a decoding device has sufficient memory capacity to decode said iterated function coded bit stream.

5. The method according to claim 4, wherein said iterated function coding comprises generating a first picture block from said input picture, generating a plurality of second picture blocks from a portion of said input picture within the determined search range, transforming the second picture blocks according to a predetermined operation, determining a transformed second picture block that is the most similar to said first picture block, selecting a second picture block corresponding to the determined transformed second picture block, and outputting code position information indicating a position of the selected second picture block and outputting a transformation parameter representing the transformation of the selected second picture block.

6. Apparatus for iterated function coding blocks in a picture, comprising:
    memory means for storing an input picture in a first picture memory;
    receiving means for receiving capacity information indicating a maximum allowable memory capacity of a second picture memory to be used for performing an iterated function decoding of a coded picture corresponding to said input picture;
    determining means for determining a search range in the stored input picture in accordance with the received maximum capacity information; and
    coding means for iterated function coding said blocks within the determined search range.

7. The apparatus according to claim 6, further comprising a local memory for storing a portion of said input picture within the determined search range, said local memory operating at a higher speed than the first picture memory.

8. The apparatus according to claim 6, wherein said means for iterated function coding comprises means for generating a first picture block from said input picture, means for generating a plurality of second picture blocks from a portion of said input picture within the determined search range, means for transforming the second picture blocks according to a predetermined operation, means for determining a transformed second picture block that is the most similar to said first picture block and for selecting a second picture block corresponding to the determined transformed second picture block, and means for outputting code position information indicating a position of the selected second picture block and for outputting a transformation parameter representing the transformation of the selected second picture block.

9. Apparatus for iterated function coding blocks in a picture, comprising:
    memory means for storing an input picture;
    generating means for generating capacity information indicating a maximum allowable memory capacity of said picture memory;
    coding means for iterated function coding said blocks in said picture using said memory means to generate a coded bit stream; and
    transmitting means for transmitting the generated coded bit stream and capacity information from said apparatus, said capacity information being transmitted to another device that determines, based upon said capacity information, whether a decoding device has sufficient memory capacity to decode said iterated function coded bit stream.

10. The apparatus according to claim 9, wherein said means for iterated function coding comprises means for generating a first picture block from said input picture, means for generating a plurality of second picture blocks from a portion of said input picture within the determined search range, means for transforming the second picture blocks according to a predetermined operation, means for determining a transformed second picture block that is the most similar to said first picture block and for selecting a second picture block corresponding to the determined transformed second picture block, and means for outputting code position information indicating a position of the selected second picture block and for outputting a transformation parameter representing the transformation of the selected second picture block.

11. A method for producing a decoded picture from a coded bit stream representing blocks of an iterated function coded picture, comprising the steps of:
    generating capacity information indicating a maximum allowable memory capacity of a picture memory for decoding said coded bit stream;
    transmitting said generated capacity information;
    receiving said coded bit stream including block position information for indicating a position of a picture block in a picture and receiving a transformation parameter representing a predetermined transform operation that has been carried out on said picture block; and
    recursively transforming said picture block identified by said block position information according to the received transformation parameter using said picture memory until a preselected condition is satisfied.

12. Apparatus for producing a decoded picture from a coded bit stream representing blocks of an iterated function coded picture, comprising:
    generating means for generating capacity information indicating a maximum allowable memory capacity of a picture memory for decoding said coded bit stream;
    transmitting means for transmitting said generated capacity information;
    receiving means for receiving said coded bit stream including block position information for indicating a position of a picture block in a picture and for receiving a transformation parameter representing a predetermined transform operation that has been carried out on said picture block; and
    transforming means for recursively transforming said picture block identified by said block position information according to the received transformation parameter using said picture memory until a preselected condition is satisfied.

13. A recording medium having recorded thereon a coding program for iterated function coding a picture, said coding program comprising the steps of;
    storing an input picture in a first picture memory;
    receiving capacity information indicating a maximum allowable memory capacity of a second picture memory to be used for iterated function decoding a coded picture corresponding to said input picture;
    determining a search range in the stored input picture in accordance with the received maximum capacity information; and
    iterated function coding blocks of said picture within the determined search range.

14. A recording medium having recorded thereon a coding program for iterated function coding a picture, said coding program comprising the steps of;
    storing an input picture in a picture memory;
    generating capacity information indicating a maximum allowable memory capacity of said picture memory;

iterated function coding said picture using said picture memory to generate a coded bit stream; and transmitting, from a device running said program, the generated coded bit stream and capacity information, said capacity information being transmitted to another device that determines, based upon said capacity information, whether a decoding device has sufficient memory capacity to decode said iterated function coded bit stream.

15. A recording medium having recorded thereon a decoding program for producing a decoded picture from a coded bit stream representing blocks of an iterated function coded picture, said decoding program comprising the steps of:

generating capacity information indicating a maximum allowable memory capacity of a picture memory for decoding said coded bit stream;

transmitting said generated capacity information;

receiving said coded bit stream including block position information for indicating a position of a picture block in a picture and receiving a transformation parameter representing a predetermined transform operation that has been carried out on said picture block; and recursively transforming said picture block identified by said block position information according to the received transformation parameter using said picture memory until a preselected condition is satisfied.

16. The method according to claim 4, wherein said encoding device transmits said capacity information to said another device over a computer network.

17. The method according to claim 16, wherein said another device is a decoding device selector, and said method further comprises:

receiving, by said decoding device selector, maximum allowable memory capacity information from each of a plurality of decoding devices over said network; and selecting, by said decoding device selector, at least one of said decoding devices for receiving said coded bit stream based on the capacity information transmitted by said encoding device and the maximum allowable capacity information transmitted by said decoding devices.

18. The method according to claim 11 wherein said generated capacity information is transmitted to an encoding device that determines a search range for iterated function coding in accordance with said capacity information.

19. The method according to claim 11 wherein said generated capacity information is transmitted to a decoding device selector that selects a decoding device for receiving said coded bit stream based on the transmitted capacity information and capacity information transmitted by an encoding device that generated said coded bit stream.

* * * * *